May 23, 1967     W. L. HARRELL ET AL     3,321,234

SLIDABLE WINDOW CLOSURE AND BOOT COMBINATION

Filed May 12, 1965     2 Sheets-Sheet 1

INVENTORS
DON E. ROWLAN,
WILSON L. HARRELL &
BY HUGH E. HARRELL Jr.

*Dunlap & Laney*
ATTORNEYS

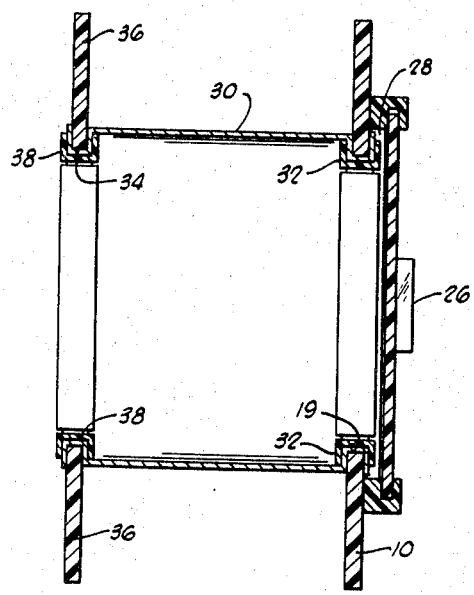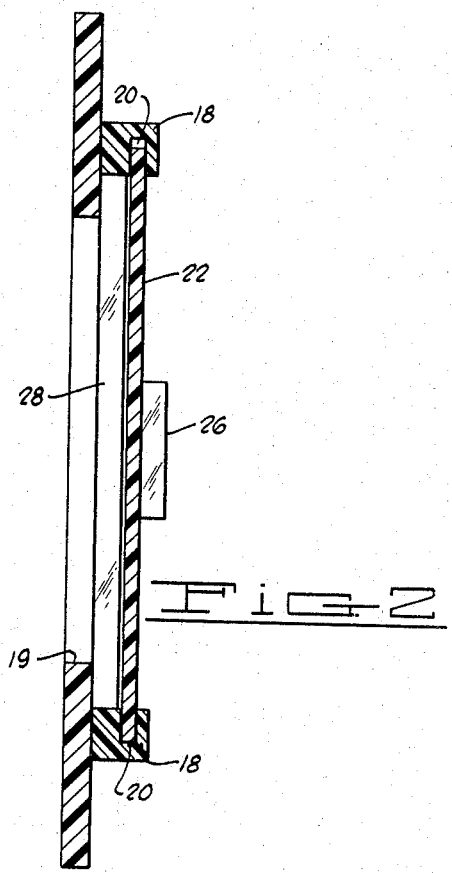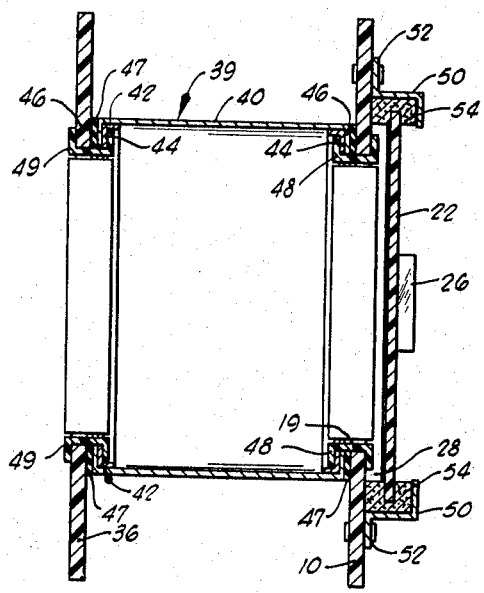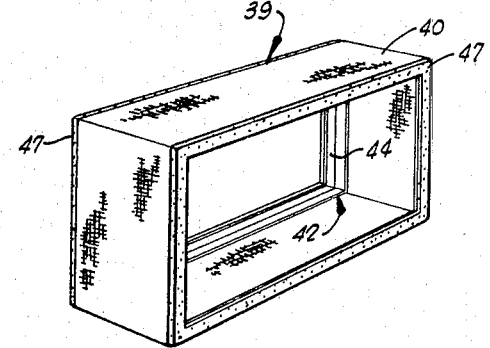

United States Patent Office 3,321,234
Patented May 23, 1967

3,321,234
SLIDABLE WINDOW CLOSURE AND BOOT COMBINATION
Wilson L. Harrell, Oklahoma City, Okla., Don E. Rowlan, 1311 SE. 41st St., Oklahoma City, Okla. 73129, and Hugh E. Harrell, Jr., Oklahoma City, Okla.; said Wilson L. Harrell and said Hugh E. Harrell, Jr., assignors to said Rowlan
Filed May 12, 1965, Ser. No. 455,209
9 Claims. (Cl. 296—23)

This invention relates to a quick opening, transparent window closure member, and particularly, to such window closure members as they are adapted to be utilized in vehicles. More specifically, the present invention relates to slidable, transparent window panels adapted to be substituted for the window glass in the rear of the cab of trucks. In one of its more specific, though non-limiting aspects, the invention relates to a slidable transparent window assembly used in combination with a boot or sleeve for the purpose of interconnecting and placing in communication, the rear window of a truck with a camper-type housing disposed to the rear of the cab of the truck.

It is currently a favorite amusement and pastime of sportsmen and vacationers to provide a housing or enclosure, sometimes termed a camper, in, or mounted on, the bed of relatively small trucks and similar vehicles, which housings can be utilized for living purposes and particularly as a shelter providing a place to sleep and store provisions. A common type of camper now in widespread use is a generally rectangular structure which is mounted on the bed of a pick-up truck to the rear of the cab thereof, and which, in many instances is provided with a forwardly extending portion which extends over and rests upon the top of the truck cab. This type of camper further has a forward wall which extends vertically in close proximity to the vertically extending rear wall of the truck cab.

It has previously been proposed to provide communication between the interior of the cab and the interior of the camper by removing the rear window of the cab and providing an aligned window opening in the forward wall of the camper so that the occupants of the cab and the camper may see each other through these openings, and may converse, and, if desired pass various articles back and forth between the two enclosed spaces. It has also been proposed to provide movable transparent closure members for both openings in order to isolate noise which may originate either in the cab or in the camper from the other space, and also to prevent cold or hot air from outside of the two enclosed spaces from entering the spaces through these openings.

The transparent window closure members have, in some instances, assumed the form of sliding transparent panels which have been suitable for some uses, and which accomplish the basic purpose of permitting the opening to be completely closed off or sealed when desired. On the other hand, the types of window closure members which have been provided to date have been relatively costly and have, in many instances, been characterized by the disadvantage of including a sliding panel which slides in such a way that the opening which is provided by movement of the panel is to one side of the longitudinal center line between the cab and the camper to the rear thereof. There is thus required, coordination or synchronization of the sliding panels which are opened in both the camper and the cab in order to have the openings aligned, and to permit physical communication between the interior of the cab and the interior of the camper. Also, a space is still permitted to exist between the opening in the rear wall of the cab and the opening in the forward wall of the camper so that it is not unusual for toys, food and miscellaneous articles being passed back and forth between the cab of the truck and the camper to be dropped and lost into the open space or void between the two openings. Moreover, there is no way to transfer cool air resulting from the air-conditioning of one of the spaces into the other space since the cold air is lost to the surrounding atmosphere as it passes between the opening in the rear wall of the cab and the opening in the front wall of the camper.

The present invention provides an improved transparent sliding panel window closure assembly for use in the rear wall of a truck cab, which assembly is more economical in construction and more easily installed and utilized than sliding panel transparent closures of the type previously available. In a further, non-limiting aspect, the invention also contemplates the inclusion in combination with the sliding panel window closure assembly, a boot or sleeve which is used to interconnect openings formed in the cab and camper when the sliding panel is moved to an open position so that there is no possibility of loss of articles being transferred between the truck cab and the camper, and so that air conditioning provided in either space can be efficiently conveyed into the other space.

Broadly described, the present invention comprises a first transparent panel dimensioned to mate with the opening in a truck cab, and having an opening formed in the center of said panel; a pair of spaced, parallel channel members secured to said first panel on opposite sides of the opening formed in the center thereof; aligned second and third transparent panels, each having opposed edges slidingly supported in said spaced, parallel channel members, said second and third transparent panels being aligned in monoplanar alignment and said channel members forming open-ended guide means to permit said second and third transparent panels to be moved toward and away from each other between a first position in which the opening in said first panel is completely closed by said second and third panels, and a second position in which the opening in said first panel is completely unobstructed by said second and third panels.

In another aspect of the invention, the novel transparent window closure assembly can be usefully employed in combination with a boot or sleeve structure, and with a second transparent closure provided in the camper or similar housing structure located to the rear of the truck cab. More specifically, a hollow, elongated boot, which can be generally cylindrical, or of rectangular cross-section, is secured at one of its ends around the opening in the previously described first transparent panel after the same is positioned in the truck cab, and the second end of the boot is secured around an opening formed in a transparent panel located in a forward, vertical wall of the camper, or merely around an opening which is formed in such forward, vertical wall. The boot is of a flexible material so as to constitute a sylphon-like tubular connection between the interiors of the cab and camper.

From the foregoing general description of the invention, it will have become apparent that a major object of the present invention is to provide an improved transparent sliding panel window closure for use in the rear wall of a truck cab to permit the solid, constantly closed, factory installed window to be replaced by a transparent closure which can be quickly opened to permit access to the exterior of the cab.

An additional object of the present invention is to provide improved communication between the cab of a truck-type vehicle and a camper or other enclosure or housing mounted on the vehicle to the rear of the cab.

An additional object of the present invention is to provide a sliding transparent closure member for installation in the rear wall of the cab or a truck, and to provide in combination with such closure member, a boot or tube communicating with an opening in a housing such as a camper positioned to the rear of a truck cab.

Another object of the invention is to permit cooled air to be communicated from the cab of a light truck to a housing carried on the bed of the truck to the rear of the cab.

An additional object of the present invention is to provide a sliding transparent closure member for use in a truck cab, which closure member includes two sliding aligned, transparent panels which may be easily slid to an open position to provide an opening aligned with the longitudinal axis of the cab.

An additional object of the present invention is to provide a quick-openable transparent closure member for use in the cab of a pick-up truck, which closure member can be economically constructed and which is of a long and trouble-free service life.

Another object of the present invention is to provide a transparent sliding-panel closure member for use in the rear wall of a pick-up truck, which closure member is constructed entirely of a transparent material and therefore offers minimum obstruction of vision from the inside to the outside of the cab.

In addition to the foregoing described objects and advantages, additional objects and advantages will become apparent as the following detailed description of the invention is read in conjunction with the accompanying drawings.

In the drawings:

FIGURE 2 is a sectional view taken along line 2—2 of FIGURE 1.

Figure 3:
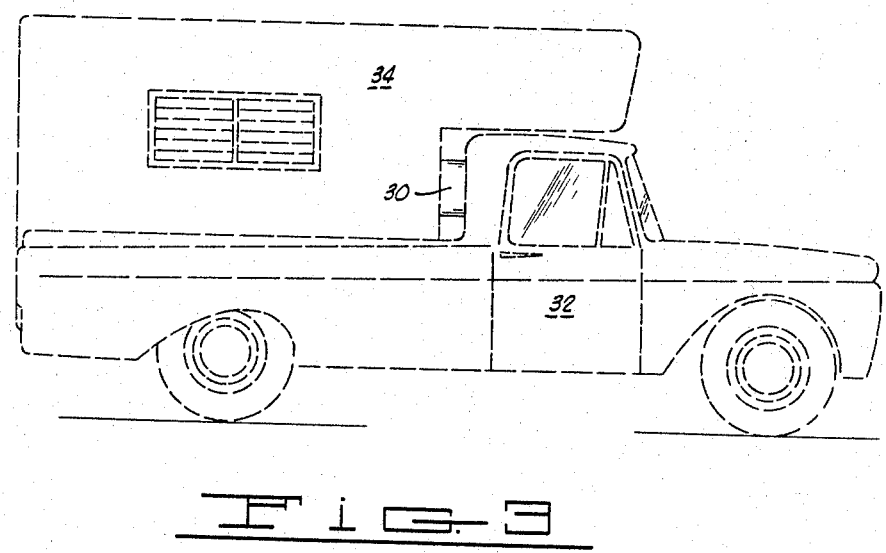

FIGURE 3 is a view in elevation of a boot used to interconnect the quick-opening, transparent window closure member of the present invention with an opening formed in a transparent window closure member disposed in the forward wall of a camper mounted on the bed of a pick-up truck. In order to better illustrate the use of the invention, the truck and camper are shown in combination with the boot and are illustrated in dashed lines.

FIGURE 4 is a vertical sectional view through the boot illustrated in elevation in FIGURE 3, and through the transparent window closure members which it interconnects which are located in the truck cab and in a housing or camper to the rear thereof.

Figure 1:
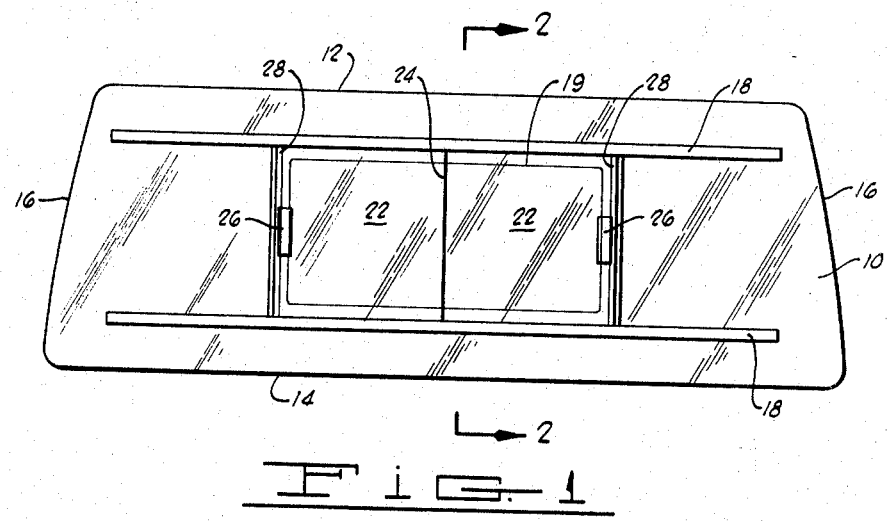
FIGURE 1 is a view in elevation of the quick-opening transparent window closure member of the present invention as it appears when viewed from inside the truck cab in which it is mounted.

FIGURE 5 is a vertical sectional view similar to the sectional view shown in FIGURE 4 but illustrating a modified embodiment of boot which may be utilized in combination with either the quick-opening, transparent window closure member shown in FIGURES 1, 2, and 4, or in combination with a modified quick-opening, transparent window closure member illustrated in combination with the boot in FIGURE 5.

FIGURE 6 is a perspective view of the embodiment of the boot which is illustrated in FIGURE 5.

Referring now to the drawings in detail, and particularly to FIGURE 1, reference character 10 designates a relatively large first transparent panel which is configured to fit the opening in the back wall of a truck vehicle of the type such as a pick-up truck. The transparent panel 10 is provided with an upper longitudinal edge 12, a lower longitudinal edge 14, and a pair of end edges 16, which edges are dimensioned to follow the contour of the opening in the cab. The thickness of the panel 10 is such that the panel can be fitted in the channel provided in the truck cab for receiving plate glass positioned at the factory during the manufacture of the truck. The panel 10 can be constructed of glass, but is preferably fabricated from a durable, strong plastic material which is easily trimmed or cut in order to adjust the size of the panel to any window opening as may be required. Plexiglas constitutes a preferred material of construction.

Extending parallel to the longitudinal edges 12 and 14 of the panel 10 are a pair of spaced, parallel channels 18 which are secured to the forward face of the panel 16. The channels 18 are spaced on opposite sides of a relatively large opening 19 which is formed in the center of the panel 10 and is preferably of rectangular configuration as illustrated in FIGURE 1. The opening 19 can be of various sizes and shapes, however, provided only that the channels 18 are disposed on opposite sides of the opening and extend generally parallel to each other.

The channels 18 are preferably of generally U-shaped cross-sectional configurations as best illustrated in FIGURE 2. In the illustrated embodiment of the invention the channels 18 are constructed of a transparent material and, like the panel 10, are preferably constructed of Plexiglas. This construction permits the channels 18 to be tenaciously bonded to the forward surface of the panel 10, and the use of Plexiglas in the construction of the channels prevents obstruction of vision through the panel 10.

By reason of their generally U-shaped cross-sectional configuration, the channels 18 define elongated slots or grooves 20 which extend over their entire length and provide tracks for the accommodation of a pair of sliding panels 22. The sliding panels 22 are each slightly larger in their dimension parallel to the channels 18 than one-half the length of the opening 19 in the panel 10. Moreover, since both of the panels 22 are slidably mounted in the tracks 20, these panels are aligned and, when slid to the position shown in FIGURE 1, contact each other along a meeting line designated by reference character 24. With the sliding panels 22 in this position, the opening 19 is completely covered thereby. To facilitate moving the sliding panels 22 in the tracks 20 in the channels 18, a handle 26 is provided on each of the sliding panels adjacent the distally opposed ends of these panels. The handles 26 are, like the sliding panels 22, and the relatively large first panel 10, constructed of Plexiglas, and can be firmly adhered to the panels 22 by techniques well understood in the art.

In the preferred embodiment of the invention illustrated in the drawings, the combined length of the panels 22 as measured in a line parallel to the longitudinal edges 12 and 14 of the panel 10 is such that the panels 22 when closed as shown in FIGURE 1 extend past the end edges of the opening 19 for a distance of several inches. This dimension of the sliding panels 22 permits a sealing bar 28 of generally rectangular cross-sectional configuration to be interposed between the ends of the sliding panels 22 and the relatively large first panel 10. In observing the position of the sealing bars 28 as illustrated in FIGURE 2 of the drawings, it will be perceived that each sealing bar extends between the spaced parallel channels 18, and is of a thickness such that it frictionally engages the rear surface of the respective sliding panel 22. The sealing bars 28 thus function to seal the truck cab against the ingress of air through the opening 19 at such a time as the sliding panels 22 are closed as illustrated in FIGURE 1.

The operation of the quick-opening, transparent window closure member of the present invention which has been described in referring to FIGURES 1 and 2 of the drawings is as follows. The relatively large transparent first panel 10 is inserted in the opening in the rear wall of the truck cab in place of the factory installed window glass. When it is then desired to place the interior of the cab in communication with the space to the rear of the cab, whether it be the open truck bed, or a camper or similar enclosed housing, the transparent sliding panels 22 may be moved apart from each other so as to develop an opening in the locus of the meeting line 24 illustrated in FIGURE 1. The opening of the sliding panels 22 is, of course, accomplished by the use of the handles 26.

The channels 18 carrying the tracks 20 do not limit or restrict the sliding movement of the sliding panels 22 in a direction parallel to the longitudinal edges 12 and 14 of the transparent panel 16 so that these sliding panels can be moved apart by any distance which may be desired.

When the sliding panels 22 are moved to their closed position as shown in FIGURE 1, the interior of the truck cab is completely sealed from the exterior thereof by the closing action of the panels 22 and the sealing action of the sealing bars 28. It should be noted that the opening which can be made by a proper movement of the sliding panels 22 can be selective in size, and located at any point within the opening 19 or in the enlarged panel 10. It is also further worthy of note that the channels 18 are single-track channels and that both of the sliding panels 22 move in the single track 20 of the channels 18. A substantial economy of construction is thus effected.

The present invention further contemplates the use, in combination with the quick-opening, transparent window closure member, of a boot or sleeve designated by reference numeral 30 and illustrated in FIGURES 3 and 4. The boot 30 functions to provide an enclosed tunnel or passageway which permits protected communication to be established between the cab of a truck, designated by reference character 32, and a camper 34 or similar enclosed housing positioned to the rear of the truck cab. The manner in which the boot 30 is mounted and cooperates with the transparent window closure member previously described is best illustrated in FIGURE 4. The boot 30 is of tubular shape and may be either rectangular or generally circular in cross-section. It is preferably constructed of a tough, flexible moisture-repellant material such as the rubberized vinyl material frequently used in constructing convertible automobile tops.

One end of the boot 30 is extended through the opening 19 provided in the transparent panel 10 as hereinbefore described and is clamped over the portion of the panel which forms the edge of the opening 19 with a series of U-shaped, resilient clips 32. The clips 32 are pressed over the end portions of the boot 30 so as to frictionally engage the boot against the surrounding portions of the transparent panel 10. Four of the clips 32 are utilized corresponding to the four sides of the opening 19. At the opposite end of the boot 30, the material of the boot is passed through an opening 34 similar to the opening 19 formed in the panel 10, the opening 34 being formed in a suitable transparent panel 36 which is secured in the forward wall of the camper 34. Clips 38 identical in cross-sectional configuration and in function to the clips 32 are used to press the end portions of the boot 30 over the portions of the transparent panel 36 which surround the opening 34 and to retain the boot in position.

With the boot extending between the transparent panels 10 and 36 and secured at its ends around the aligned openings therein, an enclosed tubular passageway is provided between the interior of the cab 32 and the interior of the camper 34. Thus, cooled air provided by air conditioning in either of these spaces may be conveyed to the other space, or food, toys, or other articles may be passed back and forth between the cab of the truck and the camper. Dust, heat and other undesirable elements can be kept out of the interiors of the cab and camper without requiring that the openings to each of these spaces be continuously maintained closed. Thus, the sliding panels 22 and the quick-opening, transparent window closure member in the rear wall of the truck cab can be maintained open even when not in use to permit voice or physical communication between the interior of the cab and camper. The flexibility of the boot 30 permits it to function as a sylphon-like connection between the camper 34 and cab 32, and the manner of its attachment with the U-shaped clips 32 and 38 permits the boot to be adapted to use in different arrangements of cab and camper in which the distance between the transparent members 10 and 36 may vary considerably.

Certain modified forms of the invention are illustrated in FIGURES 5 and 6. Referring to FIGURE 6, a modified embodiment of the boot which is employed to interconnect the openings in the truck cab and the opening in the forward wall of the camper is illustrated. The modified boot 39 includes an elongated, flexible, generally tubular member 40 which is lined at each of its ends with a metallic liner 42 which is generally complementary in configuration to the cross-sectional configuration of the flexible tubular member. Each of said metallic liners 42 is provided with a flange portion 44 which extends inwardly toward the longitudinal axis of the boot and provides a facing over which each end of the tubular member 40 is turned. The end faces of the tubular member 40 are designated by reference character 46 and are bonded to the in-turned flanges 44 of the liners 42 by any suitable method.

On the exposed end face of each of the tubular members 40, a felt cushion 47 is secured and provides a facing for abutment against the transparent panels 10 and 36 of the closure members located in the cab of the truck and in the camper, respectively. The boot 39 is secured in position around the openings in the transparent panels 10 and 36 in substantially the same manner as the embodiment of the boot illustrated in FIGURE 4. Thus, generally U-shaped resilient clips 48 and 49 are provided for securing the ends of the boot against the adjacent face of the transparent panels 10 and 36, respectively, as best illustrated in FIGURE 5.

FIGURE 5 further illustrates a modified embodiment of the quick-opening, transparent window closure member located in the cab of the pick-up truck. The modified embodiment includes a first relatively large transparent panel 10 which is identical to that illustrated in FIGURES 1, 2 and 4. The transparent panel 10 is provided with the centrally disposed aperture or opening 19 previously described. The channels 18 in the FIGURE 4 embodiment, however, are replaced in the FIGURE 5 embodiment by generally Z-shaped metallic channels 50 which have one of their flanges 52 secured to the forward face of the first transparent panel 10, and define with such first transparent panel, tracks which extend parallel to each other on opposite sides of the opening 19. Positioned in the tracks are a pair of felt sealing and weatherstripping members 54 which are the type customarily used around automobile window openings in automobiles. The transparent panels 22 described in referring to the embodiment of the invention illustrated in FIGURES 1, 2 and 4 are also employed in the FIGURE 5 embodiment, and are identical to those to which reference has previously been made. Transparent handles 26 are provided on the panels 22 and are also identical to those illustrated in the FIGURE 2 embodiment.

The FIGURE 5 embodiment of the quick-opening, transparent window closure member operates in substantially the same manner as has been described in referring to the embodiment of the invention illustrated in FIGURES 1, 2 and 4. Thus, the sliding panels 22 are moved with reference to the opening 19 formed in the enlarged first panel 10 by means of the handles 26, and are permitted to slide in the tracks provided by the Z-shaped channels 50. The opening 19 in the panel 10 may thus be entirely closed, or entirely opened, as may be determined by a person in the cab of the truck.

From the foregoing description of the invention, it is believed that it will have become apparent that the present invention provides an improved quick-opening, transparent window closure member which is particularly useful when used in conjunction with a boot to interconnect an opening in the cab of a truck with an aligned opening in a camper or other enclosed housing disposed to the rear of such cab. The employment of single track channels, and meeting, sliding transparent panels permits the closure member to be more economically constructed than the types previously provided, and yet to afford improved communication with the camper. The provision of the boot prevents dust, rain or other undesirable foreign materials from entering the opening into either the camper, or into the truck cab and also assures that materials being passed back and forth between the two openings cannot be lost if dropped.

Although certain preferred embodiments of the invention have been herein described in order to provide an example of the manner in which the invention may typically be practiced, it is to be understood that various modifications and changes in the structure herein described, or in the materials used in manufacturing the invention, can be employed without departure from the basic principles which underlie the invention. All such modifications and innovations of this type which continue to rely upon the basic princples herein enunciated are deemed to be circumscribed by the spirit and scope of the invention except as the same may be necessarily limited by the appended claims or reasonable equivalents thereof.

What is claimed is:

1. In combination:
   a truck including a cab having a window opening in the rear wall thereof;
   an enclosed housing mounted on the bed of said truck and positioned to the rear of said cab, said housing having a forward wall facing the rear wall of said cab and having an opening in said forward wall aligned with the window opening in the rear wall of said cab;
   a transparent panel positioned in said window opening and having an aperture therein in alignment with the opening in the forward wall of said enclosed housing;
   a tubular boot interconnecting the opening in the forward wall of said enclosed housing and the aperture in said transparent panel and forming a communicating passageway between the interior of the cab and the interior of the enclosed housing; and
   sliding panel means slidably mounted on the face of said transparent panel and slidable between a first position in which said aperture is opened and a second position in which said sliding panel means covers said aperture.

2. The combination claimed in claim 1 and further characterized to include a transparent closure member mounted in the forward wall of said housing and having said opening in said forward wall formed therein.

3. The combination claimed in claim 1 wherein said boot comprises an elongated, flexible tubular member having one of its ends secured around said aperture and its other end secured around the opening in said forward wall.

4. The combination claimed in claim 3 wherein said boot is further characterized in having rigid end liners positioned in each end of the boot and secured thereto, said liners each having a configuration complementary to the cross-sectional configuration of the boot and having a flange portion extending toward the longitudinal axis of the boot and occupying a plane normal to said axis to flatly abut said transparent panel around said aperture and the portion of said housing around the opening therein.

5. The combination claimed in claim 4 and further characterized to include a pad of cushioning material positioned between said flange portions and the respective portions of said housing and transparent panel which surrounds said opening and aperture, respectively.

6. The combination claimed in claim 3 and further characterized to include clip means connecting the ends of said boot with said transparent panel and said housing around said aperture and opening, respectively.

7. The combination claimed in claim 1 wherein said sliding panel means includes a pair of aligned, sliding transparent panels positioned to contact each other in end-to-end relation to close said aperture, and to move divergently from each other to open said aperture.

8. The combination claimed in claim 7 and further characterized to include at least one channel carrying a single track supporting both of said sliding panels and extending alongside said aperture for a distance at least equal to the length of said aperture.

9. In combination:
   a truck including a cab having a window opening in the rear wall thereof;
   an enclosed housing mounted on the bed of said truck and positioned to the rear of said cab, said housing having a forward wall facing the rear wall of said cab and having an opening in said forward wall aligned with the window opening in the rear wall of said cab;
   a transparent panel positioned in said window opening and having an aperture therein in alignment with the opening in the forward wall of said enclosed housing;
   sliding panel means slidably mounted on the face of said transparent panel and slidable between a first position in which said aperture is opened and a second position in which said sliding panel means covers said aperture, wherein said sliding panel means includes a pair of aligned, sliding transparent panels positioned to contact each other in end-to-end relation to close said aperture, and to move divergently from each other to open said aperture.

References Cited by the Examiner

UNITED STATES PATENTS

| | | | |
|---|---|---|---|
| 2,204,923 | 6/1940 | Buti | 49—370 |
| 2,614,882 | 10/1952 | Cook | 296—23 |
| 2,770,487 | 11/1956 | Isbell | 49—413 |
| 2,805,097 | 9/1957 | Barber | 52—208 |
| 3,185,518 | 5/1965 | Zentner | 296—23 |

BENJAMIN HERSH, *Primary Examiner.*

P. GOODMAN, *Assistant Examiner.*